(12) United States Patent
Santos et al.

(10) Patent No.: US 8,488,805 B1
(45) Date of Patent: Jul. 16, 2013

(54) PROVIDING BACKGROUND AUDIO DURING TELEPHONIC COMMUNICATION

(75) Inventors: Peter Santos, Los Altos, CA (US); Lloyd Watts, Mountain View, CA (US); Carlo Murgia, Sunnyvale, CA (US); Brian Clark, San Jose, CA (US)

(73) Assignee: Audience, Inc., Mountain View, CA (US)

( * ) Notice: Subject to any disclaimer, the term of this patent is extended or adjusted under 35 U.S.C. 154(b) by 504 days.

(21) Appl. No.: 12/649,121

(22) Filed: Dec. 29, 2009

(51) Int. Cl.
*H04B 3/00* (2006.01)
*H04M 1/00* (2006.01)

(52) U.S. Cl.
USPC .............................................. 381/77; 379/392

(58) Field of Classification Search
USPC ................. 379/392, 406.01; 381/66, 77, 94.3
See application file for complete search history.

(56) References Cited

U.S. PATENT DOCUMENTS

| | | | | |
|---|---|---|---|---|
| 5,222,251 A | * | 6/1993 | Roney et al. | 455/570 |
| 5,416,847 A | * | 5/1995 | Boze | 381/94.3 |
| 5,544,250 A | * | 8/1996 | Urbanski | 381/94.3 |
| 6,125,175 A | | 9/2000 | Goldberg et al. | |
| 6,683,938 B1 | | 1/2004 | Henderson | |
| 8,184,818 B2 | * | 5/2012 | Ishiguro | 381/66 |
| 2004/0125965 A1 | * | 7/2004 | Alberth et al. | 381/77 |
| 2008/0170703 A1 | * | 7/2008 | Zivney | 381/2 |

* cited by examiner

*Primary Examiner* — Mohammad Islam
(74) *Attorney, Agent, or Firm* — Carr & Ferrell LLP

(57) ABSTRACT

Background audio can be provided during telephonic communication. Telephonic communication can be established via a network, such as between a user of a telephony device and a communication partner having a second telephony device. A voice signal may be received from the user via a microphone integral with the telephony device. An audio track can be retrieved, for example, from memory integral with the telephony device or from a third-party service provider via the communications network. Noise reduction is performed on the voice signal to produce a clean voice signal. The clean voice signal may be combined with the audio track to produce a combined signal, such that the audio track provides background audio to the clean voice signal. The combined signal can then be transmitted from the telephony device to the second telephony device via the communications network.

21 Claims, 5 Drawing Sheets

PROVIDING BACKGROUND AUDIO DURING TELEPHONIC COMMUNICATION

BACKGROUND OF THE INVENTION

1. Field of the Invention

The present invention relates generally to enhancing telephony. More specifically, the present invention relates to providing background audio during telephonic communication.

2. Related Art

The presence of background music or other sounds can make communication between individuals more interesting and enjoyable. During a telephone call between a caller and a callee, background audio can be added to the vocal signal of the caller such that the callee hears the caller's voice plus the background audio, much like a soundtrack to a movie. Unfortunately, the addition of background audio to vocal signals during telephone calls does not necessarily yield desirable results.

For instance, if the caller is in a quiet environment, the background audio will be combined with a clean vocal signal of the caller resulting in a clean mixed signal. Thus, the callee's communication experience will be enhanced. If, on the other hand, the caller is in a noisy environment, the caller's vocal signal will be mixed with the background audio as well as the environmental noise. The environmental noise may likely conflict with the environmental noise causing the callee's communication experience to degrade.

Since the noise level of a caller's environment is oftentimes unpredictable, there is a need to eliminate or greatly reduce environmental noise from telephonic communications when background audio is added to vocal signals.

SUMMARY OF THE INVENTION

Embodiments of the present technology allow noise from the environment surrounding a caller to be eliminated or greatly reduced when background audio is to be combined with the caller's voice signal during telephonic communication.

In a claimed embodiment, a method for providing background audio during telephonic communication is disclosed. The method includes establishing telephonic communication via a network, wherein the telephonic communication is between a user of a telephony device and a communication partner having a second telephony device. A voice signal from the user is received via a microphone integral with the telephony device. Additionally, an audio track is retrieved. Noise reduction is performed on the voice signal to produce a clean voice signal. Instructions are executed using a processor integral with the telephony device to combine the clean voice signal with the audio track to produce a combined signal. In the combined signal, the audio track provides background audio to the clean voice signal. The combined signal is then transmitted from the telephony device to the second telephony device via the communications network.

Another claimed embodiment sets forth a telephony device. The telephony device includes a communications module, an audio input/output module, a media module, a noise reduction module, and a mixing module. These modules are stored in memory and are executed by a processor to effectuate the functionalities attributed thereto. The communications module is executable to establish telephonic communication via a communications network. The telephonic communication is between a user of the telephony device and a communication partner having a second telephony device. The audio input/output module is executable to receive a voice signal from the user via a microphone integral with the telephony device. The media module is executable to retrieve an audio track, such as from memory integral with the telephony device or from a third party. The noise reduction module is executable to perform noise reduction on the voice signal to produce a clean voice signal. The mixing module is executable to combine the clean voice signal with the audio track to produce a combined signal, wherein the audio track provides background audio to the clean voice signal. In addition, the communications module is executable to transmit the combined signal from the telephony device to the second telephony device via the communications network.

Yet another claimed embodiment sets forth a computer-readable storage medium having instructions embodied thereon. The instructions are executable by a processor to perform a method for providing background audio during telephonic communication. The method includes establishing telephonic communication via a network. The telephonic communication may be between a user of a telephony device and a communication partner having a second telephony device. A voice signal is received from the user via a microphone integral with the telephony device. Additionally, an audio track is retrieved. Noise reduction is performed on the voice signal to produce a clean voice signal. The clean voice signal is combined with the audio track to produce a combined signal, wherein the audio track provides background audio to the clean voice signal. The combined signal is then transmitted from the telephony device to the second telephony device via the communications network.

DETAILED DESCRIPTION OF EXEMPLARY EMBODIMENTS

The present technology provides background audio during telephonic communication. More specifically, exemplary embodiments allow noise from the environment surrounding a caller to be eliminated or greatly reduced when background audio is to be combined with the caller's voice signal during telephonic communication. Generally speaking, this can be achieved by performing noise reduction on the caller's voice signal prior to combining that signal with the background audio. In some instances, knowledge of the background audio itself may be utilized for the noise reduction procedure, allowing a greater degree of noise suppression. By obtaining a clean signal of the caller's voice prior to combining it with the background audio, a clean mixed signal can be provided. As such, a callee will hear the caller's voice along with the background audio with minimal conflicting noise from the caller's surrounding environment.

Background audio may be any audio added to a signal received and processed by an audio device such as a mobile phone. For example, the audio may be an audio track consisting of at least a portion of a song, an audio pattern, a recorded audio clip, or some other portion of audio.

Figure 1:
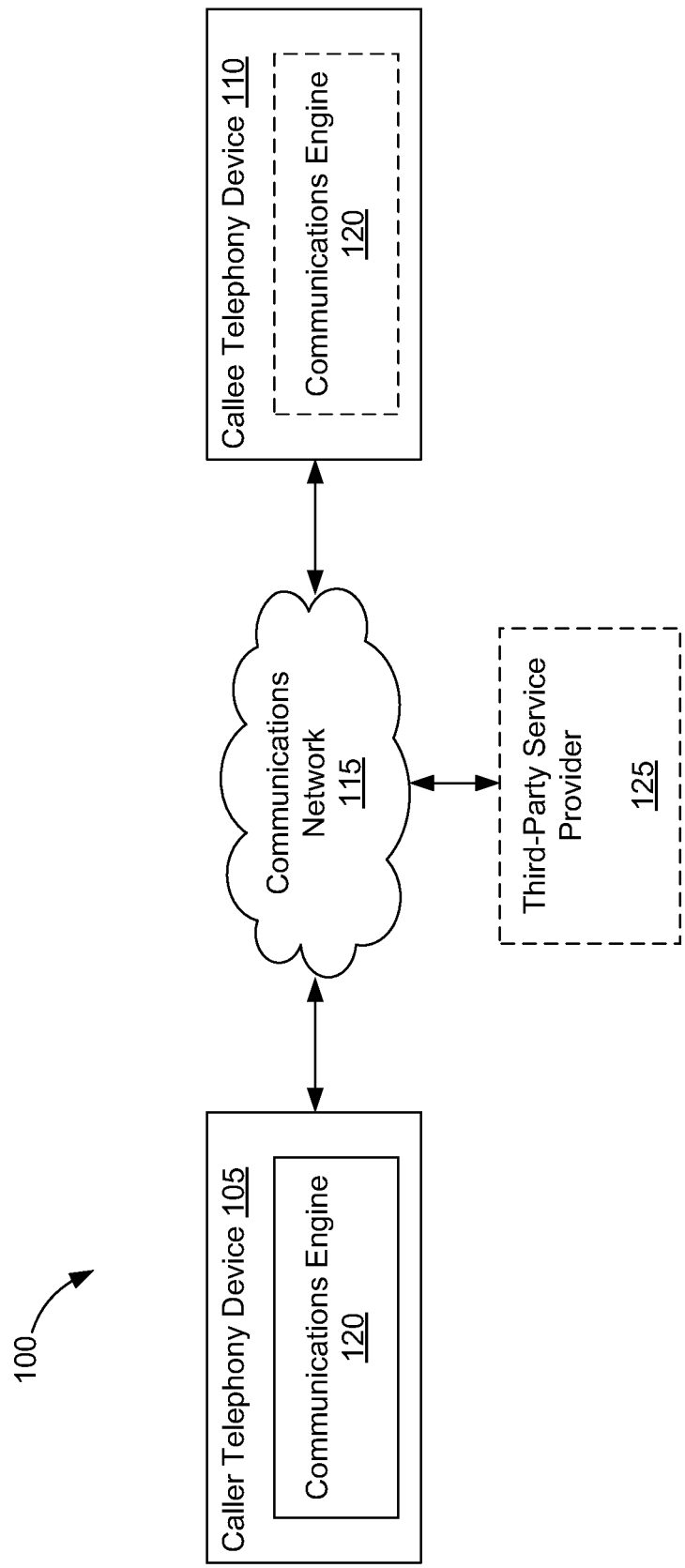
FIG. 1 is a block diagram of an exemplary environment for practicing embodiments of the present technology.

Referring now to FIG. 1, a block diagram of an exemplary environment 100 for practicing embodiments of the present technology is shown. As depicted, the environment 100 includes a caller telephony device 105 in communication with a callee telephony device 110 via a communications network 115. It is noteworthy that any number of telephony devices can be included in the environment 100. For example, three telephony devices may be in communication during a three-way call via the communications network 115. The communications network 115 includes one or more of a local area network, a wide area network, the Internet, public switched telephone network, a wireless network, or any other means for transferring information across a distance. Additionally, the environment 100 may optionally include a third-party service provider 125 in communication with the communications network 115.

The caller telephony device 105 and the callee telephony device 110 can be any device used for telephonic communication such as a cellular telephone, a Smartphone, a cordless telephone, a voice-over Internet protocol (VOIP) telephone, walkie-talkie, computer, internet telephone, video telephone, and so forth. An exemplary digital device that may be descriptive of the caller telephony device 105 or the callee telephony device 110 is set forth in connection with FIG. 5.

The caller telephony device 105, as shown in FIG. 1, includes a communications engine 120. Other telephony devices coupled to the communications network 115 such as the callee telephony device 110 can also optionally include the communications engine 120. The communications engine 120 and its constituent components may be stored in memory integral with the caller telephony device 105, as described in connection with FIG. 5. Components of the communications engine 120 may be used to provide background audio during telephonic communication between the caller telephony device 105 and the callee telephony device 110. The communications engine 120 is described in further detail in connection with FIG. 2.

The third-party service provider 125, optionally included in the environment 100, can provide audio information to telephony devices such as the caller telephony device 105 via the communications network 115. The third-party service provider 125 may, for example, be a telecommunications carrier or an entity primarily concerned with media sales and distribution. According to various embodiments, audio tracks can be downloaded or streamed from the third-party service provider 125. The audio tracks may be provided free of charge, as a one-time purchase, on a subscription basis, or other basis. Transactions involving obtaining audio tracks from the third-party service provider 125 may be similar to commonplace sales of ringtones. The audio tracks can include music, ambiance noises such as ocean or other nature sounds, or any other audible signal.

Figure 2:
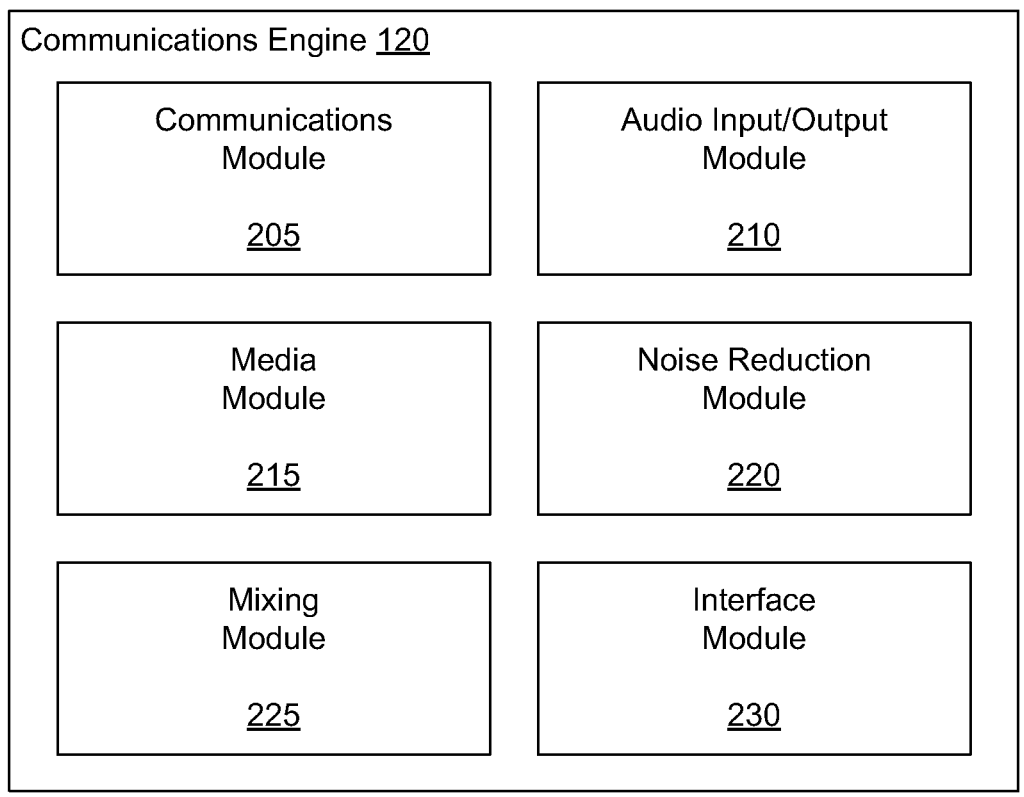
FIG. 2 is a block diagram of an exemplary communications engine that can be included in a telephony device.

FIG. 2 is a block diagram of an exemplary communications engine 120 that can be included in a telephony device such as the caller telephony device 105 or the callee telephony device 110. As depicted, the communications engine 120 includes a communications module 205, an audio input/output module 210, a media module 215, a noise reduction module 220, a mixing module 225, and an interface module 230. The constituent modules of the communications engine 120 can be executed to effectuate the functionalities attributed thereto, such as by a processor integral with a telephony device such as the caller telephony device 105 as discussed in connection with FIG. 5. The communications engine 120 can be composed of more or fewer modules (or combinations of the same) and still fall within the scope of the present technology. For example, the functionality of the audio input/output module 210 and the functionality of the interface module 230 may be combined into a single module.

Execution of the communications module 205 facilitates communication between the caller telephony device 105 and other devices or entities communicatively coupled to the communications network 115 (e.g., the callee telephony device 110 and the third-party service provider 125). For example, the communications module 205 can be executed to establish telephonic communication between the caller telephony device 105 and the callee telephony device 110. The telephonic communication between the caller telephony device 105 and the callee telephony device 110 may include transference of voice signals and background audio signals therebetween. Additionally, execution of the communications module 205 may allow data such as audio media, account information, or financial information to be transferred between the caller telephony device 105 and the third-party service provider 125 via the communications network 115.

The audio input/output module 210 can be executed to receive a voice signal from a user via a microphone integral with a telephony device. For example, the audio input/output module 210 may be executable to receive voice signals from the caller via a microphone integral with the caller telephony device 105, as described in connection with FIG. 5. The audio input/output module 210 is further executable to provide playback of audio via a speaker integral with the telephony device. For instance, the execution of the audio input/output module 210 can allow the caller to hear the background audio in addition to the callee's voice via a speaker integral with the caller telephony device 105, as described in connection with FIG. 5. The background audio heard by the caller and the callee may be the same or different, according to various embodiments. This can also be extended to multiple communication partners (e.g., three-way calling), where each communication partner hears similar, different, or no background audio.

The media module 215 is executable to retrieve an audio track to be combined with the caller's voice signal as background audio. The audio track may be retrieved from memory integral with the telephony device. Alternatively, the audio track can be retrieved from a third party such as the third-party service provider 125 via the communication network 115. In this case, the audio track may be downloaded or streamed from the third-party service provider 125. According to some embodiments, the audio track may be retrieved based on the identity of the communication partner of the caller. For example, if the callee's favorite song is known, that song may be retrieved when telephonic communication is established between the caller and the callee. Audio tracks that correspond to certain communication partners may also be predetermined or retrieved based on a preferred genre.

Execution of the noise reduction module 220 allows a processor integral with the caller telephony device 105 to perform noise reduction on the caller voice signal to produce a clean voice signal. A variety of proprietary or well-known noise reduction techniques may be utilized during execution of the noise reduction module 220. Additionally, the noise reduction may be performed on a frequency subband basis. An example of a suitable noise reduction method is disclosed in U.S. patent application Ser. No. 12/422,917, entitled "Adaptive Noise Cancellation," filed on Apr. 13, 2009, the disclosure of which is incorporated herein by reference.

In exemplary embodiments, the noise reduction module 220 is executable to perform noise reduction, at least in part, by utilizing knowledge of the audio track to produce the clean voice signal prior to actual combination of the clean voice signal with the audio track. As is known to those skilled in the art, noise suppression can lead to subtle distortion of the wanted signal (e.g., voice component of a signal), whereby increasing the degree of suppression leads to increased distortion. Put another way, increased noise reduction of a signal which includes a voice signal component and noise signal component may remove a portion of a desired voice signal component along with the noise signal component. The absence of a portion of the desired voice signal component results in distortion of the voice signal. A masking effect can be achieved by utilizing knowledge of the audio track during noise reduction so that a listener is more tolerant to small distortions introduced by the noise suppression. For example, noise suppression may be performed for an audio signal when the level of the background signal to be mixed with the audio signal is sufficient to mask any distortion caused by the noise suppression. Analysis of a background signal to determine a masking level may consider spectral shape, anticipated signal-to-noise ratio (SNR) or other characteristics. Therefore, by utilizing the audio track during noise reduction to mask distortion effects due to noise suppression, stronger noise suppression can be performed.

The mixing module 225 can be executed to combine the clean voice signal with the audio track to produce a combined signal such that the audio track provides background audio to the clean voice signal. This combination can be done in any number of ways. For example, simple or weighted summation of the two signals may be performed through execution of the mixing module 225. Additionally, the combination of the clean voice signal and the audio track may be performed on a frequency subband basis.

The interface module 230 is executable to allow the caller to interact with various modules of the communications engine 120. For example, the caller may select the audio track from a plurality of available audio tracks presented on a display integral with the caller telephony device 105. As alluded to herein, the plurality of available audio track may be stored in memory integral with the caller telephony device 105 or be available from the third-party service provider 125. The caller may purchase the audio track from the third-party service provider 125, when the interface module 230 is executed, by entering account or financial information. Furthermore, execution of the interface module 230 may allow the caller to control various aspects of the combined voice and audio track signal such as the relative volume levels therebetween.

Figure 3:
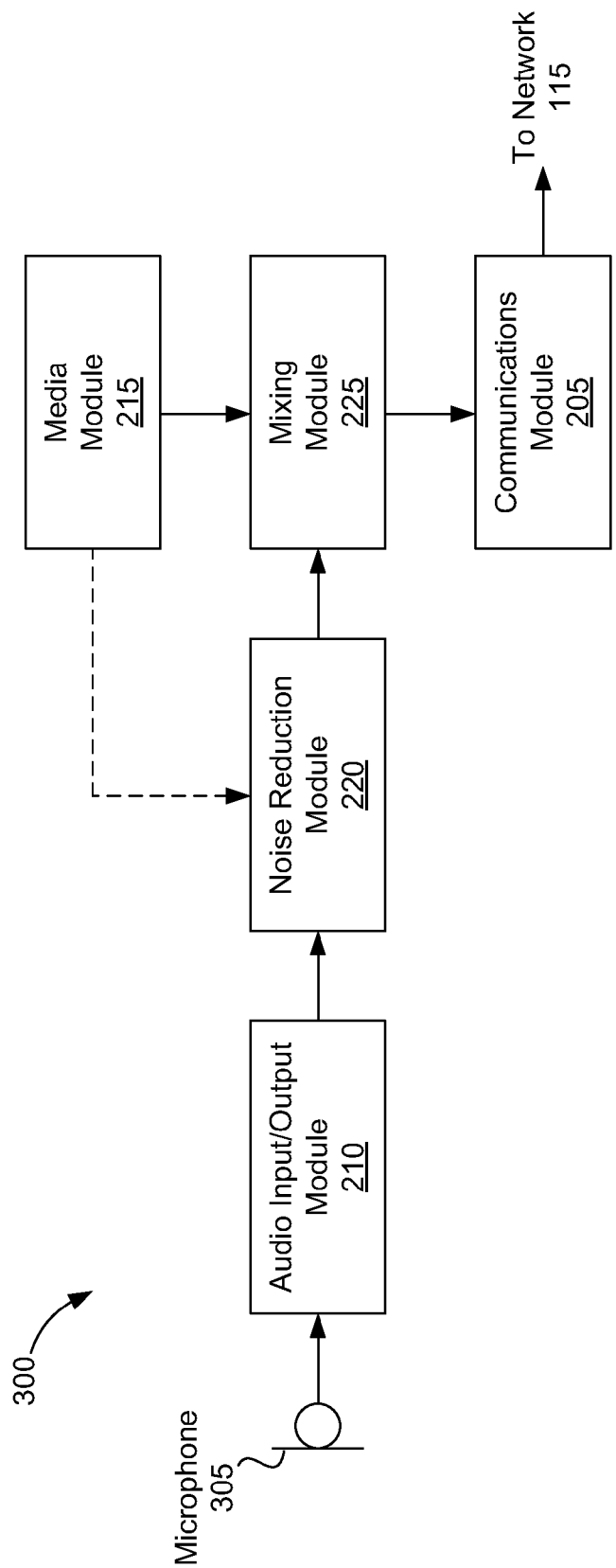
FIG. 3 is a block diagram illustrating exemplary signal flow among various modules included in the communications engine.

FIG. 3 is a block diagram illustrating exemplary signal flow 300 among various modules included in the communications engine 120. As depicted, the caller's voice signal and noise from the environment surrounding the user are received by the audio input/output module 210 via the microphone 305 as a noisy voice signal. The noisy voice signal is then passed on to the noise reduction module 220. The noise reduction module 220 performs noise reduction on the noisy voice signal to produce a clean voice signal. Optionally, the media module 215 provides the audio track to the noise reduction module 220 during noise reduction. The clean voice signal is passed from the noise reduction module 220 to the mixing module 225, which combines the clean voice signal with the audio track received from the media module 215. The combined signal is forwarded to the communications module 205, where it is transferred to another telephony device (e.g., the callee telephony device 110) via the communication network 115.

Figure 4:
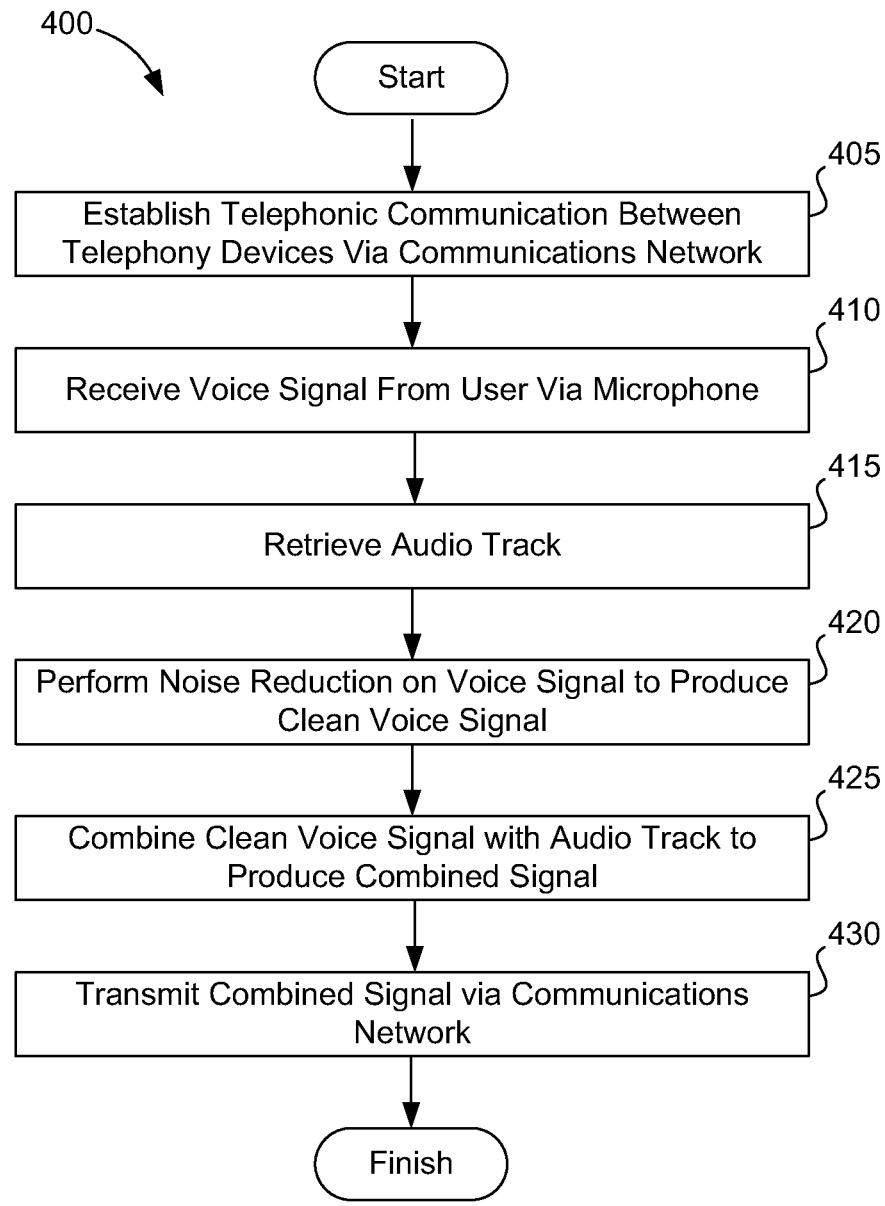
FIG. 4 is a flowchart of an exemplary method for providing background audio during telephonic communication.

FIG. 4 is a flowchart of an exemplary method 400 for providing background audio during telephonic communication. The steps of the method 400 may be performed in varying orders. Steps may be added or subtracted from the method 400 and still fall within the scope of the present technology.

In step 405, telephonic communication is established via a communications network such as the communications network 115. The telephonic communication can be between a user of a telephony device and a communication partner having a second telephony device. The telephony device and the second telephony device can, respectively, be the caller telephony device 105 and the callee telephony device 110. According the exemplary embodiments, the communications module 205 is executed to perform step 405.

In step 410, a voice signal from the user is received via a microphone integral with the telephony device. The voice signal may contain noise from the surrounding environment of the user. The audio input/output module 210 may be executed to perform step 410.

In step 415, an audio track is retrieved. According to various embodiments, the audio track can be retrieved from memory integral with the telephony device or from a third-party (e.g., the third-party service provider 125). Additionally, the audio track can be streamed or downloaded to the telephony device. The media module 215 can be executed to perform step 415.

In step 420, noise reduction is performed on the voice signal to produce a clean voice signal. The noise reduction eliminates or greatly reduces noise components of the voice signal. The noise reduction module 220 is executable to perform step 420. In exemplary embodiments, the noise reduction can be performed, at least in part, by utilizing knowledge of the audio track to produce the clean voice signal prior to actual combination of the clean voice signal with the audio track, as in the following step.

In step 425, the clean voice signal is combined with the audio track to produce a combined signal. Instructions, such as those embodied by the mixing module 225, may be executed using a processor integral with the telephony device to produce a combined signal. In the combined signal, the audio track provides background audio to the clean voice signal.

In step 430, the combined signal is transmitted from the telephony device to the second telephony device via the communications network. The communications module 205 can be executed to perform step 430.

Figure 5:
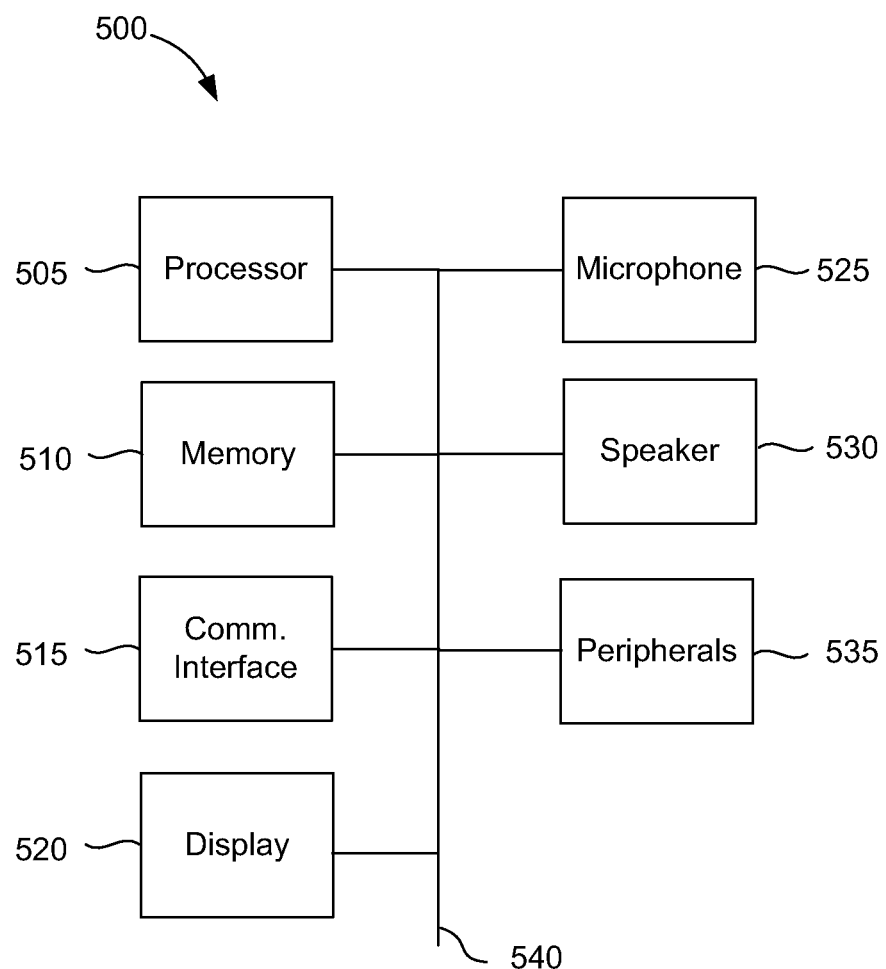
FIG. 5 is a block diagram of an exemplary digital device that may be used to implement an embodiment of the present technology.

FIG. 5 is a block diagram of an exemplary digital device 500 that may be used to implement an embodiment of the present technology. The digital device 500, as depicted, includes a processor 505, a memory 510, a communications interface 515, a display 520, a microphone 525, a speaker 530, peripherals 535, and a bus 540 that facilitates communication therebetween. It is noteworthy that the components of the digital device 500 may be integrated within the digital device 500 or communicatively coupled with the digital device. The communicative coupling may be wired or wireless. Other various components (not shown) that are not necessary for describing the present technology may also be included in the digital device 500, in accordance with exemplary embodiments. The digital device 500 may include any device that receives and sends information or signals, such as a cellular telephone, a Smartphone, a cordless telephone, a voice-over Internet protocol (VOIP) telephone, walkie-talkie, computer, internet telephone, video telephone, and so forth. The peripherals 535 may include any type of support device to add additional functionality to the digital device 500.

The processor 505 may execute instructions and/or a program to effectuate the functionality described thereby or associated therewith. Such instructions may be embodied by the communications engine 120 and be stored in memory 510. The processor 505 may include a microcontroller, a microprocessor, or a central processing unit. In some embodiments, the processor can include some amount of on-chip ROM and/or RAM. Such on-chip ROM and RAM can include the memory 510.

The memory 510 includes a computer-readable storage medium. Common forms of computer-readable storage media include, for example, a floppy disk, a flexible disk, a hard disk, magnetic tape, any other magnetic medium, a CD-ROM disk, digital video disk (DVD), and non-volatile memory such as NAND flash and NOR flash. Furthermore, the memory 510 may comprise other memory technologies as they become available.

The communications interface 515 includes hardware necessary for communicatively coupling the digital device 500 with a network such as the communications network 115. The communications interface 515 operates in conjunction with the communications module 205 to allow data to be transferred between the digital device 500 and other devices or entities coupled to the network.

The display 520 may include a liquid crystal display (LCD) or other suitable display device. The display 520 receives textual and graphical information processed by the processor 505 and outputs that information visibly to a user of the digital device 500.

The microphone 525 can include any device capable of receiving an audio signal. In exemplary embodiments, the microphone 525 includes an electroacoustic device that can convert audible sound from the environment proximal to a user of the digital device 500 to an audio signal.

The speaker 530 may include any device capable of outputting an audio signal. For example, the output device can comprise an electroacoustic device that can render an audio signal audible in the environment proximal to a user of the digital device 500. In some implementations, the microphone 525 and the speaker 530 are integrated into a single device that is wirelessly coupled to the digital device 500, such as a Bluetooth wireless headset.

The components contained in the digital device 500 of FIG. 5 are those typically found in telephony devices that may be suitable for use with embodiments of the present technology and are intended to represent a broad category of such components that are well known in the art. The digital device 500 can also include different bus configurations, networked platforms, multi-processor platforms, etc. Various operating systems can be used including Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing background audio during telephonic communication, the method comprising:
   receiving a noisy voice signal from a user via a microphone integral with a first telephony device, the noisy voice signal including a user voice signal and background noise from an environment;
   retrieving an audio track;
   performing noise reduction on the noisy voice signal utilizing characteristics of the audio track to reduce the background noise in the noisy voice signal to produce a clean voice signal, such that at least some distortion effects caused by the noise reduction are masked through the utilization of the characteristics of the audio track, so as to increase the level of noise reduction performed on the noisy voice signal or to decrease the perceived distortion of the clean voice signal, the characteristics including one or more of a level of the audio track, a spectral shape of the audio track, and an estimated signal-to-noise ratio of the audio track;
   executing instructions, using a processor integral with the first telephony device, to combine the clean voice signal with the audio track to produce a combined signal, the audio track providing background audio to the clean voice signal; and
   transmitting the combined signal from the first telephony device via a communications network.

2. The method of claim 1, further comprising establishing telephonic communication via the communications network, the telephonic communication established between the user of the first telephony device and a communication partner having a second telephony device.

3. The method of claim 2, wherein the audio track is stored in memory integral with the first telephony device.

4. The method of claim 1, wherein the audio track is streamed to the first telephony device from a third party via the communications network.

5. The method of claim 1, further comprising selecting the audio track from a plurality of available audio tracks via a user interface integral with the first telephony device.

6. The method of claim 1, wherein the audio track is purchased by the user via a user interface integral with the first telephony device.

7. The method of claim 2, wherein the audio track is retrieved based on the identity of the communication partner.

8. The method of claim 2, further comprising providing playback of the audio track via a speaker integral with the first telephony device.

9. The method of claim 8, wherein the audio track provides background audio to a voice signal of the communication partner received by the first telephony device via the communications network.

10. The method of claim 1, further comprising controlling relative volume levels between the audio track and the clean voice signal.

11. The method of claim 1, the noise reduction being performed so as to increase the level of noise reduction performed on the noisy voice signal and to decrease the perceived distortion of the clean voice signal.

12. A telephony device for providing background audio during telephonic communication, the telephony device comprising:
   a communications module stored in memory and executable by a processor to establish telephonic communication via a network, the telephonic communication being between a user of the telephony device and a communication partner having a second telephony device;
   an audio input/output module stored in memory and executable by a processor to receive a noisy voice signal from the user via a microphone integral with the telephony device, the noisy voice signal including a user voice signal and background noise from an environment;
   a noise reduction module stored in memory and executable by a processor to perform noise reduction on the noisy voice signal utilizing characteristics of an audio track to reduce the background noise in the noisy voice signal to produce a clean voice signal, such that at least some distortion effects caused by the noise reduction are masked through the utilization of the characteristics of the audio track, so as to increase the level of noise reduction performed on the noisy voice signal or to decrease the perceived distortion of the clean voice signal, the characteristics including one or more of a level of the audio track, a spectral shape of the audio track, and an estimated signal-to-noise ratio of the audio track; and
   a mixing module stored in memory and executable by a processor to combine the clean voice signal with the audio track to produce a combined signal, the audio track providing background audio to the clean voice signal,
   wherein the communications module is executable to transmit the combined signal from the telephony device to the second telephony device via the communications network.

13. The telephony device of claim 12, further comprising a media module stored in memory and executable by a processor to retrieve the audio track, wherein the media module is executable to retrieve the audio track when the audio track is stored in memory integral with the telephony device.

14. The telephony device of claim 13, wherein the media module is executable to retrieve the audio track when the audio track is streamed to the telephony device from a third party via the communications network.

15. The telephony device of claim 13, wherein the media module is executable to retrieve the audio track based on the identity of the communication partner.

16. The telephony device of claim 12, further comprising an interface module stored in memory and executable by a processor to allow the user to select the audio track from a plurality of available audio tracks.

17. The telephony device of claim 12, further comprising an interface module stored in memory and executable by a processor to allow the user to purchase the audio track.

18. The telephony device of claim 12, wherein the audio input/output module is further executable to provide playback of the audio track via a speaker integral with the telephony device.

19. The telephony device of claim 18, wherein the audio track provides background audio to a voice signal of the communication partner.

20. The telephony device of claim 12, the noise reduction being performed so as to increase the level of noise reduction performed on the noisy voice signal and to decrease the perceived distortion of the clean voice signal.

21. A non-transitory computer-readable storage medium having instructions embodied thereon, the instructions executable by a processor to perform a method for providing background audio during telephonic communication, the method comprising:
   establishing telephonic communication via a network, the telephonic communication being between a user of a telephony device and a communication partner having a second telephony device;
   receiving a noisy voice signal from the user via a microphone integral with the telephony device, the noisy voice signal including a user voice signal and background noise from an environment;
   retrieving an audio track;
   performing noise reduction on the noisy voice signal utilizing characteristics of the audio track to reduce the background noise in the noisy voice signal to produce a clean voice signal, such that at least some distortion effects caused by the noise reduction are masked through the utilization of the characteristics of the audio track, so as to increase the level of noise reduction performed on the noisy voice signal or to decrease the perceived distortion of the clean voice signal, the characteristics including one or more of a level of the audio track, a spectral shape of the audio track, and an estimated signal-to-noise ratio of the audio track;
   combining the clean voice signal with the audio track to produce a combined signal, the audio track providing background audio to the clean voice signal; and
   transmitting the combined signal from the telephony device to the second telephony device via the communications network.

* * * * *